US008398751B2

(12) United States Patent
Yang et al.

(10) Patent No.: US 8,398,751 B2
(45) Date of Patent: Mar. 19, 2013

(54) DIRECT STRIPPING CYCLONE

(75) Inventors: Yong-Lin Yang, Katy, TX (US); Eusebius Gbordzoe, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 13/333,308

(22) Filed: Dec. 21, 2011

(65) Prior Publication Data
US 2012/0107189 A1 May 3, 2012

Related U.S. Application Data

(63) Continuation of application No. 12/174,700, filed on Jul. 17, 2008, now Pat. No. 8,083,838.

(51) Int. Cl.
*B01D 45/12* (2006.01)

(52) U.S. Cl. ............... 95/271; 55/424; 55/426; 55/430; 55/459.1; 422/144; 422/145; 422/147

(58) Field of Classification Search ............ 55/345–346, 55/424–425, 459.1; 422/144–145, 147
See application file for complete search history.

(56) References Cited

U.S. PATENT DOCUMENTS

| 3,123,547 | A | 3/1964 | Palmer et al. |
|---|---|---|---|
| 3,802,570 | A | 4/1974 | Dehne |
| 4,455,220 | A | 6/1984 | Parker et al. |
| 4,502,947 | A | 3/1985 | Haddad et al. |
| 4,514,285 | A | 4/1985 | Niccum et al. |
| 4,664,889 | A | 5/1987 | Steenge et al. |
| 4,692,311 | A | 9/1987 | Parker et al. |
| 4,741,883 | A | 5/1988 | Haddad et al. |
| 4,778,488 | A | 10/1988 | Koers |
| 4,810,264 | A | 3/1989 | Dewitz |
| 4,863,500 | A | 9/1989 | Rombout et al. |
| 5,569,435 | A | 10/1996 | Fusco et al. |
| 5,636,795 | A | 6/1997 | Sedgwick |
| 5,843,377 | A | 12/1998 | Fandel et al. |
| 5,869,008 | A | 2/1999 | Dewitz |
| 6,228,260 | B1 | 5/2001 | Conrad et al. |
| 6,270,544 | B1 | 8/2001 | Mencher et al. |
| 6,296,812 | B1 | 10/2001 | Gauthier et al. |
| 6,846,463 | B1 | 1/2005 | Dries et al. |
| 7,108,138 | B2 | 9/2006 | Simpson |
| 7,160,518 | B2 | 1/2007 | Chen et al. |
| 7,179,428 | B2 | 2/2007 | Dries |
| 2006/0049082 | A1 | 3/2006 | Niccum et al. |

*Primary Examiner* — Jason M Greene
*Assistant Examiner* — Dung H Bui
(74) *Attorney, Agent, or Firm* — KBR IP Legal Dept.

(57) ABSTRACT

Systems and methods for the separation of a particulate-fluid suspension are provided. An apparatus for the separation of a particulate-fluid suspension can include an enclosed vessel having two or more sections disposed coaxially along a common longitudinal centerline, wherein a first section has a first cross sectional area and a second section has a second cross sectional area. A plurality of apertures can be disposed about the second section. The apparatus can have a cylindrical surface, parallel to the longitudinal centerline of the apparatus, disposed within the first section. A fluid distribution channel having a plurality of apertures can be disposed either about an exterior surface or an interior of the apparatus. A plurality of fluid conduits can provide fluid communication between the fluid distribution channel and the plurality of apertures distributed about the second section.

20 Claims, 6 Drawing Sheets

DIRECT STRIPPING CYCLONE

CROSS-REFERENCE TO RELATED APPLICATIONS

This application is a continuation of co-pending U.S. patent application Ser. No. 12/174,700, filed on Jul. 17, 2008, and published as U.S. Publication No. 2010/0012595, which is incorporated by reference herein.

BACKGROUND

1. Field

The present embodiments generally relate to apparatus and methods for separating particulate-fluid suspensions. More particularly, embodiments of the present invention relate to apparatus and methods for separating particulate-fluid suspensions and stripping the settled particulates within a single vessel.

2. Description of the Related Art

Cyclonic separation has been used to separate a mixture or suspension containing at least two components with differing densities, for example suspensions of particulates in a carrier fluid. The separation is typically accomplished by introducing the solid/fluid suspension to a generally cylindrical separator on a tangential axis to the separator. The centrifugal force generated by the tangential introduction of the suspension to the separator results in the accumulation of a dense solid phase along the walls of the separator, and, through centripetal motion, a less dense fluid phase in the center of the separator. In a traditional cyclonic separator, the solids can flow along the walls of the separator, accumulating at a low point in the separator for removal, while the relatively solids-free fluid can be withdrawn from the center of the separator. Such cyclonic separation methods can be used to purify a solid or fluid phase, to concentrate a solid or fluid phase, to terminate chemical and physical interactions between mixed phases, or any combination thereof.

As with most separation processes, the cyclonic separation of a suspension into independent fluid and solid phases, can result in the entrapment and adsorption of fluid in the accumulated solids within the separator. Accordingly, because of high reaction rates in catalytic cracking applications, an important consideration in cyclonic separation of light hydrocarbon products from the coke-covered particulate catalyst is the displacement of the entrapped and/or adsorbed light hydrocarbons from the separated particulate catalyst. Displacement of any entrapped or adsorbed light hydrocarbons from the separated particulate catalyst will minimize side-reactions between the catalyst and any residual light hydrocarbons present in the settled particulate catalyst, thereby helping to control conversion product profiles and to minimize additional "delta coking" on the surface of the particulate catalyst.

A need, therefore, exists for new apparatus and methods for separating a suspension containing a fluid and solid particulates, while stripping entrained fluid and adsorbed hydrocarbons from the separated solids prior to removal from the separator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Apparatus and methods for separating a particulate-fluid suspension are provided. In one or more embodiments, an apparatus for the separation of a particulate-fluid suspension can include an enclosed vessel having two or more sections disposed coaxially along a common longitudinal centerline, wherein a first section has a first cross sectional area, and a second section has a second cross sectional area. A plurality of apertures can be disposed about the second section. The apparatus can have a cylindrical surface, parallel to the longitudinal centerline of the apparatus, disposed within the first section. A distribution channel having a plurality of apertures can be disposed about an exterior surface of the apparatus. A plurality of fluid conduits can provide fluid communication between the distribution channel and the plurality of apertures distributed about the second section.

Figure 1:
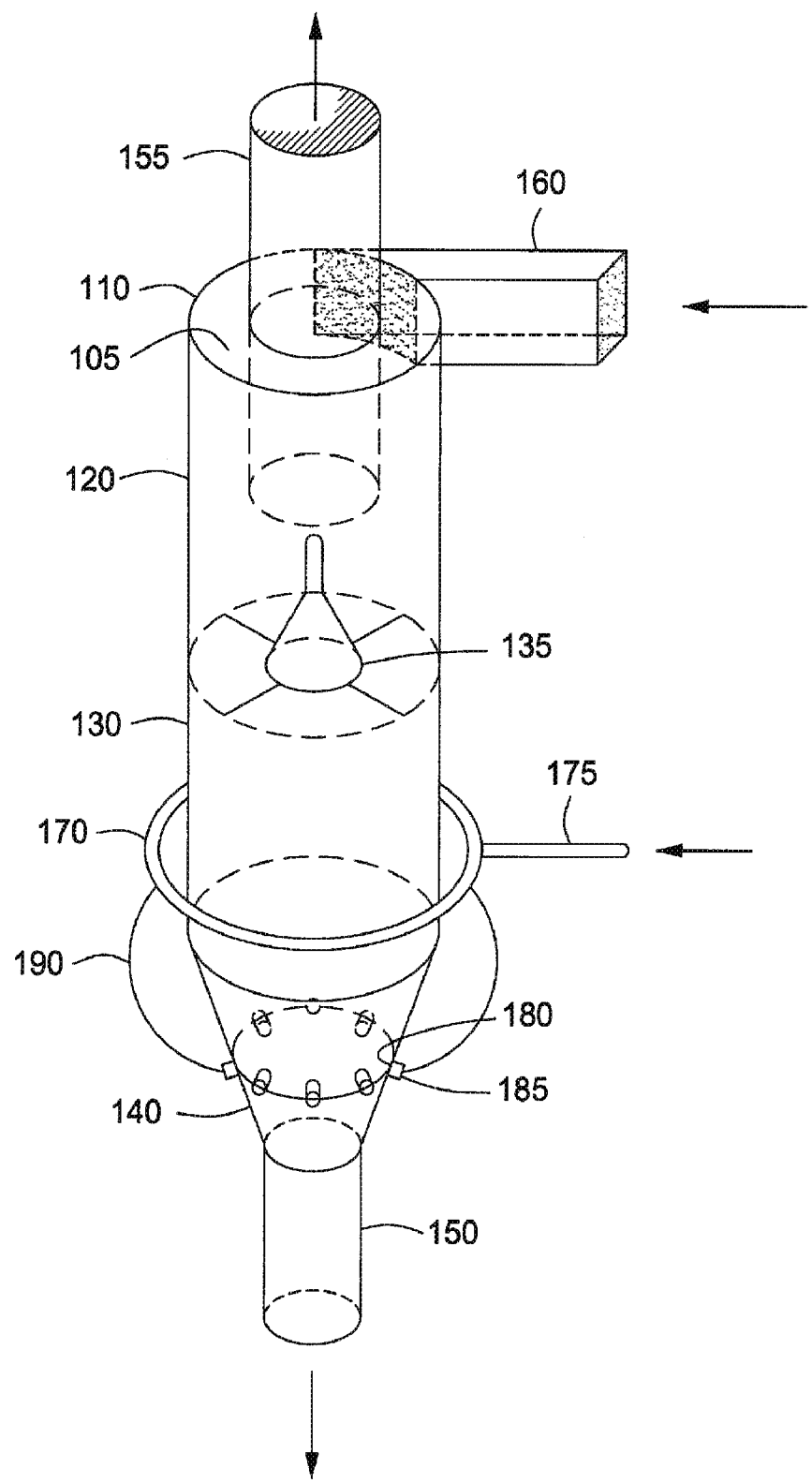
FIG. 1 depicts an orthogonal sectional view of an illustrative separator according to one or more embodiments described.

FIG. 1 depicts an orthogonal sectional view of an illustrative separator 100 according to one or more embodiments. The separator 100 can be an enclosed vessel 110, having an integral separation ("first") section 120, stripping ("second") section 130, and an inverted frustoconical bottom 140 having one or more apertures 180 disposed therethrough. In one or more embodiments, one or more nozzles 185 can be disposed in each of the apertures 180. In one or more embodiments, a fluid distribution channel 170 can be disposed about the separator 100. In one or more embodiments, the fluid distribution channel 170 can be in fluid communication with the one or more apertures 180 and/or nozzles 185 via one or more fluid conduits 190. In one or more embodiments, a stripping fluid can be introduced to the stripping section 130 of the separator 100 via the fluid distribution channel 170, and nozzles 185. The introduction of the stripping fluid via the one or more nozzles 185 can assist in removing entrained or entrapped gasses from the separated solids within the stripping section 130 of the separator 100.

In one or more embodiments, the separator 100 can include the first, separation, section 120 and the second, stripping, section 130. In one or more embodiments, the diameter of the first and second sections 120, 130 can be fixed to provide cylindrical members. In one or more embodiments, the diameter of the first and second sections 120, 130 can be variable to provide conical or frustoconical sections. In one or more embodiments, any combination or frequency of fixed and variable sections can be used to provide the separator 100. In one or more embodiments, the inside diameter of the first section 120 can be identical to the inside diameter of the second section 130. In one or more embodiments, the first section 120 of the separator 100 can be an elongated cylindrical member having a constant diameter ("$d_{120}$") and cross sectional area ("$A_{120}$"), which defines an open, circular, cross section having a first ("upper") end and a second ("lower") end. In one or more embodiments, the first section 120 can be fabricated from any heat resistant metal, including, but not limited to carbon steel, carbon steel alloys, stainless steel, stainless steel alloys, nickel, nickel alloys, or any combination thereof.

In one or more embodiments, a laminate containing one or more abrasion resistant materials, including one or more high strength metals, such as tungsten or commercially available abrasion resistant alloys including, but not limited to Manganol, Mangalloy, Hadfield, Tufloy, Formalloy, Chapalloy and/or Ultramet, can be bonded, attached, laminated or disposed on all or a portion of the interior surface of the first section 120 of the separator 100. In one or more embodiments, one or more non-metallic laminates, for example one or more laminates containing one or more abrasion resistant ceramic and/or refractory materials, can be disposed on all or a portion of the inner wall of the first section 120 of the separator 100. In one or more embodiments, the diameter, $d_{120}$, of the first section 120 can range from about 0.1 m (4 in.) to about 10 m (32 ft.); from about 0.3 m (12 in.) to about 3 m (10 ft.); or from about 0.5 m (1.6 ft.) to about 2 m (6.5 ft.).

The terms "up" and "down"; "upper" and "lower"; "upwardly" and "downwardly"; "upstream" and "downstream"; "above" and "below"; and other like terms as used herein refer to relative positions to one another and are not intended to denote a particular direction or spatial orientation.

One or more connections ("inlet connection") 160 can be disposed on, in or about the wall forming the first section 120. In one or more embodiments, the inlet connection 160 can enter the first section 120 tangentially, i.e. with at least one side or edge of the fluid inlet connection at a tangent to the outside diameter of the first section 120. In one or more embodiments, at least one side or edge of the inlet connection 160 can be aligned with the first, upper, end of the first section 120. The connection 160 can be four-sided, having a square or rectangular cross section with a dimension parallel to the longitudinal centerline of the first section 120 ranging from about 0.1 $d_{120}$ to about 0.75 $d_{120}$; about 0.2 $d_{120}$ to about 0.6 $d_{120}$; or about 0.25 $d_{120}$ to about 0.5 $d_{120}$. The connection 160 dimension perpendicular to the longitudinal centerline of the first section 120 can range from about 0.05 $d_{120}$ to about 0.5 $d_{120}$; about 0.05 $d_{120}$ to about 0.15 $d_{120}$; or about 0.05 $d_{120}$ to about 0.15 $d_{120}$. In one or more specific embodiments, the connection 160 dimension parallel to the longitudinal centerline of the first section 120 can be 0.5 $d_{120}$. In one or more specific embodiments, the connection 160 dimension perpendicular to the longitudinal centerline of the first section 120 can be 0.1 $d_{120}$.

The first, upper, end of the first section 120 can be partially or completely sealed using an end plate, cap or plug 105. In one or more embodiments, a connection ("fluid outlet connection") 155 can be concentrically disposed through the end plate 105. The connection 155 can provide a flowpath connecting the interior of the first section 120 of the separator 100 with the exterior of the separator 100. The connection 155 can be any closed shape suitable for providing a conduit or channel fluidly connecting the interior and exterior of the separator 100. In one or more embodiments, the connection 155 can be a pipe or duct having a constant diameter ("$d_{155}$"), i.e. circular, cross section. In one or more embodiments, all or a portion of the connection 155 can extend or internally project into the first section 120 of the separator 100. In one or more embodiments, the connection 155 can project a distance into the first section 120 ranging from about 0.25 $d_{120}$ to about 0.9 $d_{120}$; about 0.35 $d_{120}$ to about 0.75 $d_{120}$; or about 0.4 $d_{120}$ to about 0.65 $d_{120}$. In one or more embodiments, the diameter, $d_{155}$, of the fluid discharge connection 155 can range from about 0.1 $d_{120}$ to about 0.75 $d_{120}$; about 0.2 $d_{120}$ to about 0.6 $d_{120}$; or about 0.25 $d_{120}$ to about 0.5 $d_{120}$. In one or more embodiments, the diameter, $d_{155}$, of the connection can be 0.5 $d_{120}$.

The second section 130 can be formed as an elongated cylindrical member having a constant inside diameter ("$d_{130}$") and cross sectional area ("$A_{130}$"). The second section 130 of the separator 100 can define an open, circular, cross section, having a first, upper, end and a second, lower, end. In one or more embodiments, the first section 120 and the second section 130 can be coaxially aligned along a common longitudinal centerline of the separator 100. In one or more embodiments, the inside diameter, $d_{120}$, of the first section can equal the inside diameter, $d_{130}$, of the second section, as depicted in FIG. 1. Where the first section 120 and second section 130 share a common inside diameter, the first section 120 and the second section 130 can be directly attached or connected. In one or more embodiments, the second section 130 can be fabricated using one or more metallic and/or non-metallic, heat resistant, materials including, but not limited to, carbon steel, carbon steel alloys, stainless steel, stainless steel alloys, nickel, nickel alloys, or any combination thereof. In one or more embodiments, the inside diameter, $d_{130}$, of the second section 130 can range from about 0.1 m (4 in.) to about 10 m (32 ft.); from about 0.3 m (12 in.) to about 3 m (10 ft.); or from about 0.5 m (1.6 ft.) to about 2 m (6.5 ft.).

One or more stabilizers 135 can be disposed within the separator 100. In one or more embodiments, the one or more stabilizers 135 can be internally disposed in coaxial alignment with the longitudinal centerline of the separator 100. In one or more specific embodiments, the stabilizer 135 can be disposed internally within the separator 100, at the intersection of the first and second sections 120, 130. In one or more embodiments, the stabilizer 135 can be a hollow, right, conic section having an opening angle ranging from about 20° to about 180°; about 45° to about 135°; or about 45° to about 90°. In one or more specific embodiments, the stabilizer 135 can be a hollow, right, conic section having an opening angle of about 90°. In one or more embodiments, the stabilizer 135 can be disposed with the apex of the conical stabilizer disposed towards the first section 120. In one or more embodiments, the stabilizer 135 can be disposed with the base of the stabilizer 135 forming an angle of from about 60° to about 90° measured with respect to the longitudinal centerline of the separator 100. In one or more embodiments, the base of the stabilizer 135 can form an angle of about 90° measured with respect to the longitudinal centerline of the separator 100. In one or more embodiments, the transverse disposition of the stabilizer 135 within the separator 100 can form a continuous or segmented annular passage between the outside perimeter of the base of the stabilizer 135 and the interior surface and/or wall of the separator 100. In one or more embodiments, the stabilizer 135 can have a centering rod externally attached to the apex of the cone, projecting from the stabilizer 135 for a distance of between 0.25 and 10 times the overall height of the cone forming the stabilizer 135. The base diameter of the stabilizer 135 can range from about 0.25 $d_{130}$ to about 0.8 $d_{130}$; from about 0.3 $d_{130}$ to about 0.75 $d_{130}$; or from about 0.5 $d_{130}$ to about 0.75 $d_{130}$.

The inverted frustoconical bottom or transition section 140 can be disposed coaxially along the longitudinal centerline of the separator 100 between the second section 130 and one or more connections ("particulate discharge connections") 150. In one or more embodiments, the transition section 140 can have a frustoconical configuration with a first, upper, end having a diameter equal to the diameter of the second section 130 $d_{130}$ and a second, lower, end having a diameter equal to the diameter of the connection 150, $d_{150}$. In one or more embodiments, the upper end of the transition section 140 can connect to the second, lower, end of the second section 130 while the lower end of the transition section 140 can attach to the one or more connections 150. In one or more embodiments, the length of the transition section 140, as measured along the longitudinal axis of the separator 100, can range from about 0.75 $d_{120}$ to about 0.5 $d_{120}$; about 0.1 $d_{120}$ to about 0.4 $d_{120}$; or about 0.1 $d_{120}$ to about 3 $d_{120}$. The inverted frustoconical bottom or transition section 140 (or third section) can have a frustoconical inner surface, wherein a first end of this third section has an inside diameter equal to the second inside diameter. The second section 130 is disposed between the first section 120 and the first end of the third section. The section 120, second section 130, and third section are disposed coaxially along a common longitudinal centerline.

One or more apertures 180 can be disposed in any number, order, arrangement, frequency, or configuration about the wall forming the transition section 140. In one or more embodiments, one or more coupling devices, such as one or more weld-o-lets, thread-o-lets, or any combination thereof, can be disposed on the exterior surface of the transition section 140, about each aperture 180. In one or more embodiments, the apertures 180 can be of uniform diameter. In one or more embodiments, the apertures 180 can have two or more different diameters. In one or more embodiments, one or more nozzles 185 can be installed within the one or more apertures 180. In one or more embodiments, the diameter of the apertures 180 can range from about 0.6 cm (0.25 in.) to about 7.5 cm (3 in.); from about 1.3 cm (0.5 in.) to about 5 cm (2 in.); or from about 1.3 cm (0.5 in) to about 3.7 cm (1.5 in.).

In one or more embodiments, the one or more connections 150 can be attached to the lower end the transition section 140. In one or more embodiments, the one or more connections 150 can be coaxially aligned with the longitudinal centerline of the separator 100. In one or more embodiments, settled solids can be removed from the second section 130 of the separator 100 via the one or more connections 150. The connection 150 can be any closed shape capable of providing a fluid conduit or channel connecting the interior and the exterior of the separator 100. In one or more embodiments, the connection 150 can be a pipe or duct of circular cross section, having a diameter $d_{150}$. In one or more embodiments, the diameter of the connection 150 can range from about 0.1 $d_{120}$ to about 0.75 $d_{120}$; about 0.2 $d_{120}$ to about 0.6 $d_{120}$; or about 0.25 $d_{120}$ to about 0.5 $d_{120}$. In one or more specific embodiments, the diameter of the connection 150 can be 0.4 $d_{120}$.

In one or more embodiments, a distribution header ("fluid distribution channel") 170 can be disposed externally about the second section 130 of the separator 100. The fluid distribution channel 170 can have any closed shape capable of providing a continuous fluid conduit connecting the one or more fluid inlets 175 to the one or more fluid conduits 190 disposed about the separator 100. In one or more embodiments, the distribution channel 170 can be a plenum attached directly to the exterior wall of the separator 100, for example a three-sided, U-shaped, plenum using the exterior surface of the separator wall 100 as a fourth side of the distribution channel 170. In one or more embodiments, the distribution channel 170 can be made of any available pipe or tubing of a diameter selected to minimize the pressure drop within the distribution channel 170. In one or more embodiments, one or more inlets 175, connecting the distribution channel 170 to one or more external fluid supplies, can be disposed in any order or configuration about the distribution header 170. In one or more embodiments, the diameter of the distribution channel 170 can range from about 2.5 cm (1 in.) to about 15 cm (6 in.); from about 3.7 cm (1.5 in.) to about 10 cm (4 in.); or from about 3.7 cm (1.5 in.) to about 7.5 cm (3 in.).

In one or more embodiments, one or more fluid conduits 190 can connect the distribution channel 170 to the one or more nozzles 185. In one or more embodiments, the diameter of the one or more fluid conduits 190 can be selected to minimize the overall pressure drop between the external fluid supply and the nozzles 185. In one or more embodiments, the one or more fluid conduits 190 can be connected to the distribution header 170 via threads, flanges, quick connect connectors such as cam-lock fittings, and/or welding. In one or more embodiments, the one or more fluid conduits 190 can be connected to the one or more nozzles 185 via threads, flanges, quick connect connectors, and/or welding. In one or more embodiments, one or more quarter-turn isolation valves (not shown) can be disposed in some or all of the fluid conduits 190. In one or more embodiments, one or more needle or similar type throttling valves (not shown) can be disposed in some or all of the fluid conduits 190. In one or more embodiments, the one or more fluid conduits 190 can be fabricated using metallic and/or non-metallic rigid piping, rigid tubing, flexible tubing, flexible piping wire reinforced flexible piping or any combination thereof. In one or more embodiments, the diameter of the fluid conduits 190 can range from about 0.6 cm (0.25 in.) to about 5 cm (2 in.); from about 1.3 cm (0.5 in.) to about 3.8 cm (1.5 in.); or from about 1.3 cm (0.5 in.) to about 2.5 cm (1 in.).

The one or more nozzles 185 can be disposed in each aperture 180 located in the transition section 140. The one or more nozzles 185 can provide an even distribution of fluid supplied by the fluid channel 170 to the nozzles 185 via the one or more fluid conduits 190 within the second section 130. In one or more embodiments, the nozzles 185 disposed in the transition section 140 can be identical. In one or more embodiments, the nozzles 185 disposed in the transition section 140 can include two or more different types of distribution nozzles. In one or more embodiments, the nozzles 185 can include one or more non-clogging type which can prevent the entry of solids from the transition section 140 into the nozzles 185. Typical fluid distribution nozzles 185 can include, but are not limited to Bete NF fan nozzles, Bete FF fan nozzles, and/or Bete MP whirl type nozzles.

Figure 2:
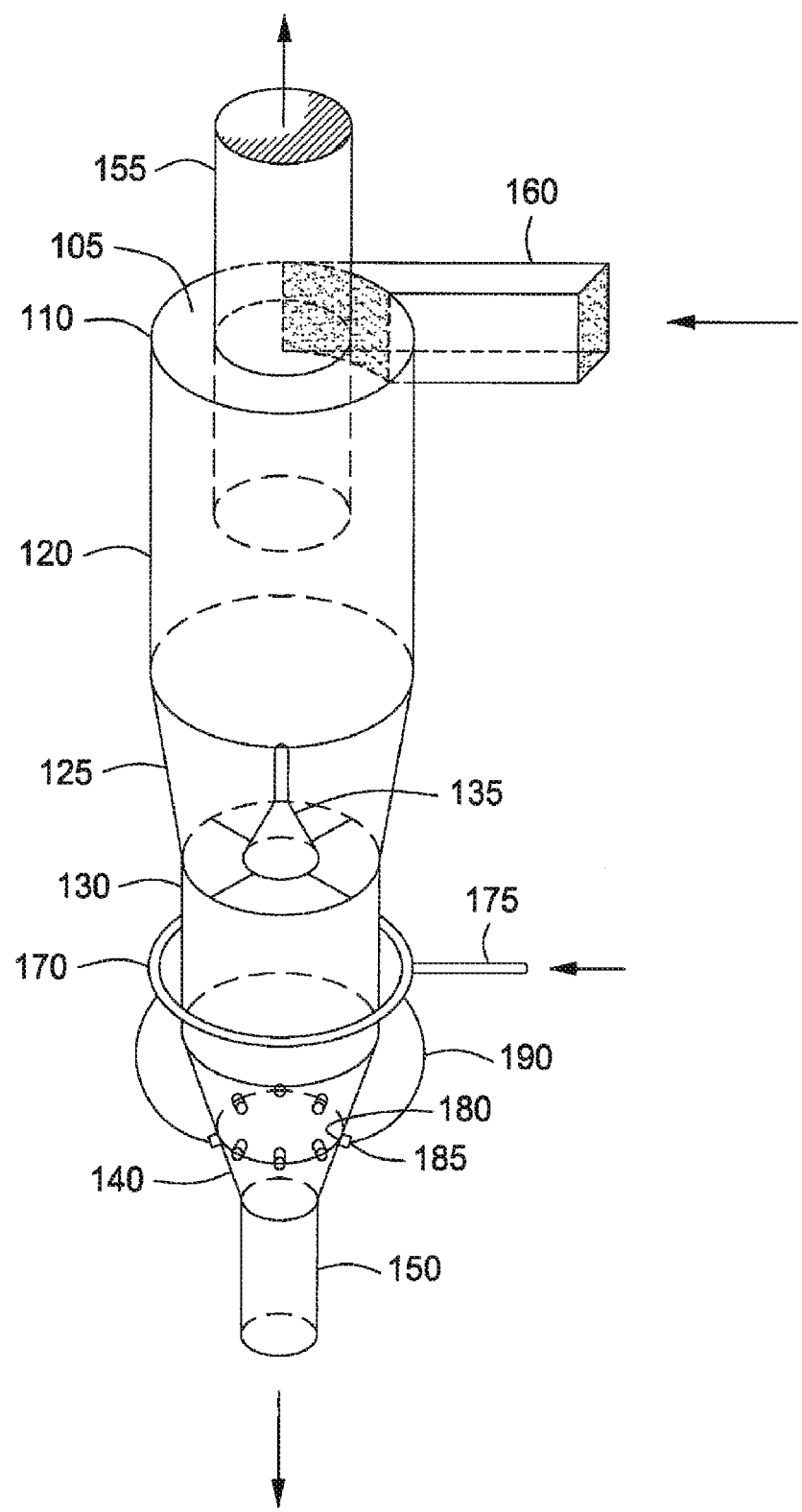
FIG. 2 depicts an orthogonal sectional view of another illustrative separator according to one or more embodiments described.

FIG. 2 depicts an orthogonal sectional view of another illustrative separator 200 according to one or more embodiments. The separator 200 depicted in FIG. 2 can be an enclosed vessel 110, with integral separation ("first") section 120 having a first diameter $d_{120}$, stripping ("second") section 130 having a second diameter $d_{130}$, and an inverted frustoconical bottom 140 having one or more apertures 180 disposed therethrough. In one or more embodiments, one or more nozzles 185 can be disposed in each of the apertures 180. In one or more embodiments, a fluid distribution channel 170 can be disposed about an exterior circumference of the second section 130 of the separator 100. In one or more embodiments, the fluid distribution channel 170 can be in fluid communication with the one or more apertures 180 and/or nozzles 185 via one or more fluid conduits 190.

The first and second sections 120, 130 of the separator 200, as depicted in FIG. 2, can have a two or more inside diameters. In one or more specific embodiments, the inside diameter $d_{120}$ of the first section 120 can be greater than the inside diameter of the second section 130, $d_{130}$. The upper end of the second section 130 can be attached to the lower end of the first section 120 by one or more transition sections 125. In one or more embodiments, the transition section 125 can be a frustoconical member disposed between the lower end of the first section 120 and the upper end of the second section 130. In one or more specific embodiments, the transition section 125 can be an annular member, having an outside diameter equal to the diameter $d_{120}$ of the second, lower, end of the first section 120 and an inside diameter equal to the diameter $d_{130}$ of the first, upper, end of the second section 130.

Figure 3:
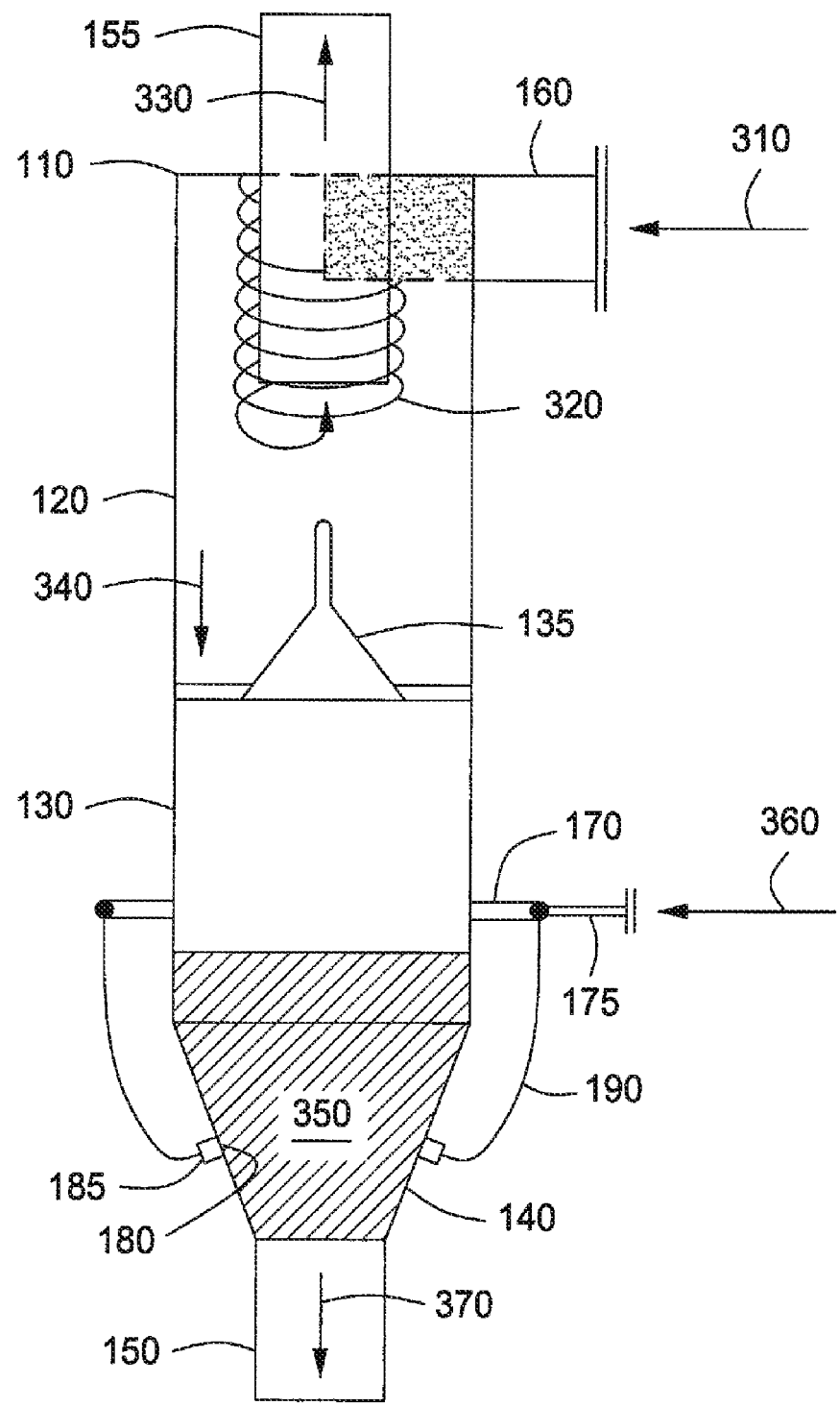
FIG. 3 depicts a partial cross-sectional view of an illustrative separator in operation in accordance with one or more embodiments described.

FIG. 3 depicts a partial cross-sectional view of an illustrative separator in operation in accordance with one or more embodiments. In operation, a particulate-fluid suspension 310 can be introduced to the separator 100 via the connection 160. A relatively particulate-free fluid phase 330 can be withdrawn via the connection 155, while a relatively fluid-free particulate phase 370 can be withdrawn via the connection 150.

Within the first section 120, centrifugal force imparted by the tangential entry of the particulate-fluid suspension 310, can propel the higher density particulates contained in the particulate-fluid suspension 310 towards the outside wall of the separator 100. The particulates, having a greater density than the fluid in line 310, can settle into the second section 130 of the separator, forming a particulate bed 350 therein. The lower density fluid phase can flow via centripetal motion towards the center of the first section 120 of the direct stripping separator 100 for removal via the connection 155. In one or more embodiments, the solids concentration in the fluid phase 330 removed from the separator 100 via the connection 155 can be less than about 25% wt. solids; less than about 20% wt. solids; less than about 15% wt. solids; less than about 10% wt. solids; less than about 5% wt. solids; or less than about 1% wt. solids.

In one or more embodiments, one or more fluids 360 can be introduced from an external supply (not shown) to the distribution channel 170 via the one or more inlets 175. The fluid 360 can be introduced via the one or more fluid conduits 190 and nozzles 185 at one or more points in the transition section 140. The selection of an appropriate fluid 360 can depend on a variety of factors, including the composition of the particulates, as well as compatibility with process fluids and products. For example, in catalytic cracking service, steam can be used to provide at least a portion of the stripping fluid 360. In one or more embodiments, the stripping fluid can flow upward through the settled particulates ("particulate bed") 350, stripping any residual process fluids trapped within the settled particulates into the first section 120 for removal via fluid discharge connection 155. In one or more embodiments, the introduction of the one or more fluids 360 to the settled particulates 350 can fluidize the settled particulates 350, thereby forming a highly turbulent, "rolling" suspension of particulates suspended in the fluid. In one or more embodiments, the particulate concentration in the particulate discharge 370 from the second section 130 can be about 40% wt. or more; about 60% wt. or more; about 80% wt. or more; about 90% wt. or more; about 95% wt. or more; or about 99% wt. or more.

Figure 4:
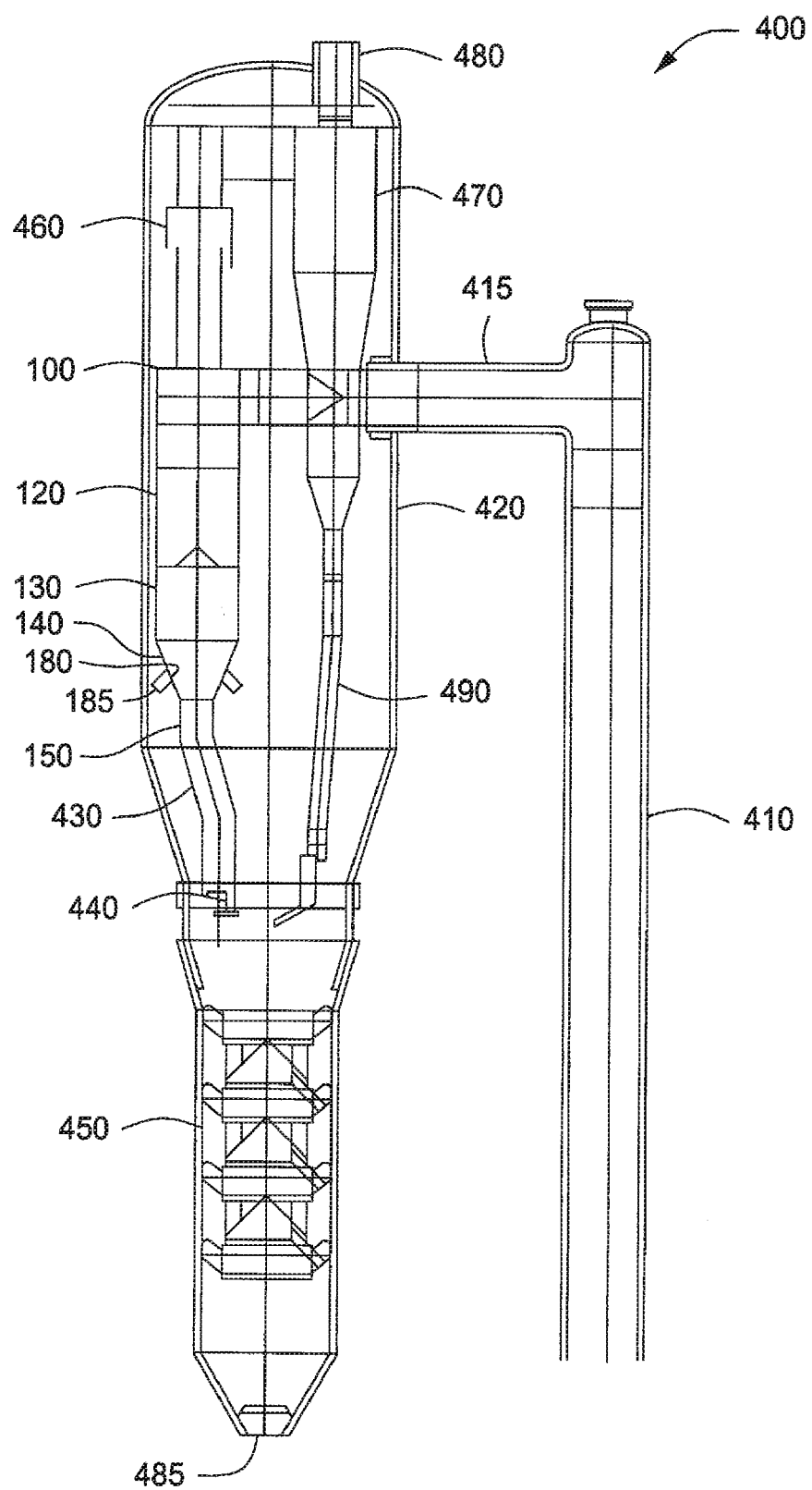
FIG. 4 depicts a partial cross-sectional view of an illustrative fluidized catalytic cracker incorporating one or more separators according to one or more embodiments described.

FIG. 4 depicts a partial cross-sectional view of an illustrative fluidized catalytic cracker ("FCC") 400 incorporating one or more separators 100 according to one or more embodiments. Although not depicted in FIG. 4, in one or more embodiments, a hydrocarbon feed, steam and particulate catalyst can be introduced to a riser reactor ("riser") 410. Within the riser 410, the hydrocarbon feed can crack, forming one or more gaseous light hydrocarbon products and one or more heavy hydrocarbon by-products which can deposit as a layer of carbonaceous coke on the surface of the particulate catalyst.

The gaseous light hydrocarbons and coke-covered particulate catalyst can exit the riser 410 as a particulate-fluid suspension via duct 415. In one or more embodiments, the particulate-fluid suspension in duct 415 can be introduced via the connection 160 to the first section 120 of the one or more separators 100 located within the separator 420. Within the first section 120, the coke-covered particulate catalyst can be selectively separated from the one or more gaseous light hydrocarbon products. In one or more embodiments, the one or more gaseous light hydrocarbon products can be withdrawn from the separator 100 via a discharge duct 460. In one or more embodiments, as depicted in FIG. 4, the separator 100 can be slip-fitted to the discharge duct 460 within the separator 420. Slip fitting of the separator 100 to the discharge duct 460 can eliminate the need for an expansion joint between the separator 100 and the discharge duct 460.

The coke covered particulate catalyst from the first section 120 can settle into the second section 130 and the transition section 140 of the separator 100. One or more stripping fluids, for example steam, can be introduced to the separator 100 via one or more nozzles 185 located in one or more apertures 180 disposed in a wall of the transition section 140 of the separator 100. The stripping fluid introduced via the one or more nozzles 185 can mix with the coke covered particulate catalyst accumulated in the second section 130 and transition section 140, forming a turbulent, fluidized bed therein.

The turbulent mixing of the settled coke-covered particulate catalyst with one or more stripping fluids in the in the second section 130 of the separator 100 can strip, separate or otherwise remove any residual light hydrocarbon products from the coke-covered particulate catalyst. The coke-covered particulate catalyst can be removed from the separator 100 via the connection 150. In one or more embodiments, the separator 100 can be operated at a positive pressure, i.e. a pressure greater than the ambient pressure within the separator 420 surrounding the separator 100.

In one or more embodiments, after passing through the connection 150, the coke-covered particulate catalyst can drop through duct 430 to a discharge valve 440. In one or more embodiments, the discharge valve 440 can be modulated, i.e. cycled open and closed, to control the accumulation of coke-covered particulate catalyst within the separator 100. The coke covered particulate catalyst passing through the valve 440 can fall into a regenerator section 450 of the separator vessel 420. Within the regenerator section 450, the coke covering the particulate catalyst can be combusted or otherwise removed from the particulate catalyst, thereby forming a waste gas containing carbon monoxide and carbon dioxide and clean, regenerated catalyst. The regenerated catalyst can be removed from the separator vessel 420 via one or more discharge connections 485. The waste gas can be exhausted from the separator vessel 420 for further treatment and/or recovery (not shown). All or a portion of the regenerated particulate catalyst removed via the one or more discharge connections 485 can be recycled for use within the riser 410.

In one or more embodiments, the one or more gaseous light hydrocarbons removed from the separator 100 via the discharge duct 460. The separator 100 can be fitted to the discharge duct 460 without the use of an expansion joint. The lack of an expansion joint between the separator 100 and the duct 460 can eliminate the need for one or more overpressure protection devices on the separator 100 since the separator 100 and the duct 460 are not sealed. The gaseous light hydrocarbons removed via the discharge duct 460 can be introduced to one or more second stage cyclones 470. Within the one or more second stage cyclones 470 any residual particulate catalyst present can be selectively separated from the one or more gaseous light hydrocarbon products. Any particulate catalyst removed in the second stage cyclones 470 can fall through the second stage cyclone 470 into a discharge duct 490 and thence into the regeneration section 450 within the separator 420. In one or more embodiments, the one or more gaseous light hydrocarbon products can be withdrawn from the second stage cyclones 470 and exit the separator 420 via discharge duct 490.

EXAMPLES

The foregoing discussion can be further described with reference to the following non-limiting examples.

Figure 5:
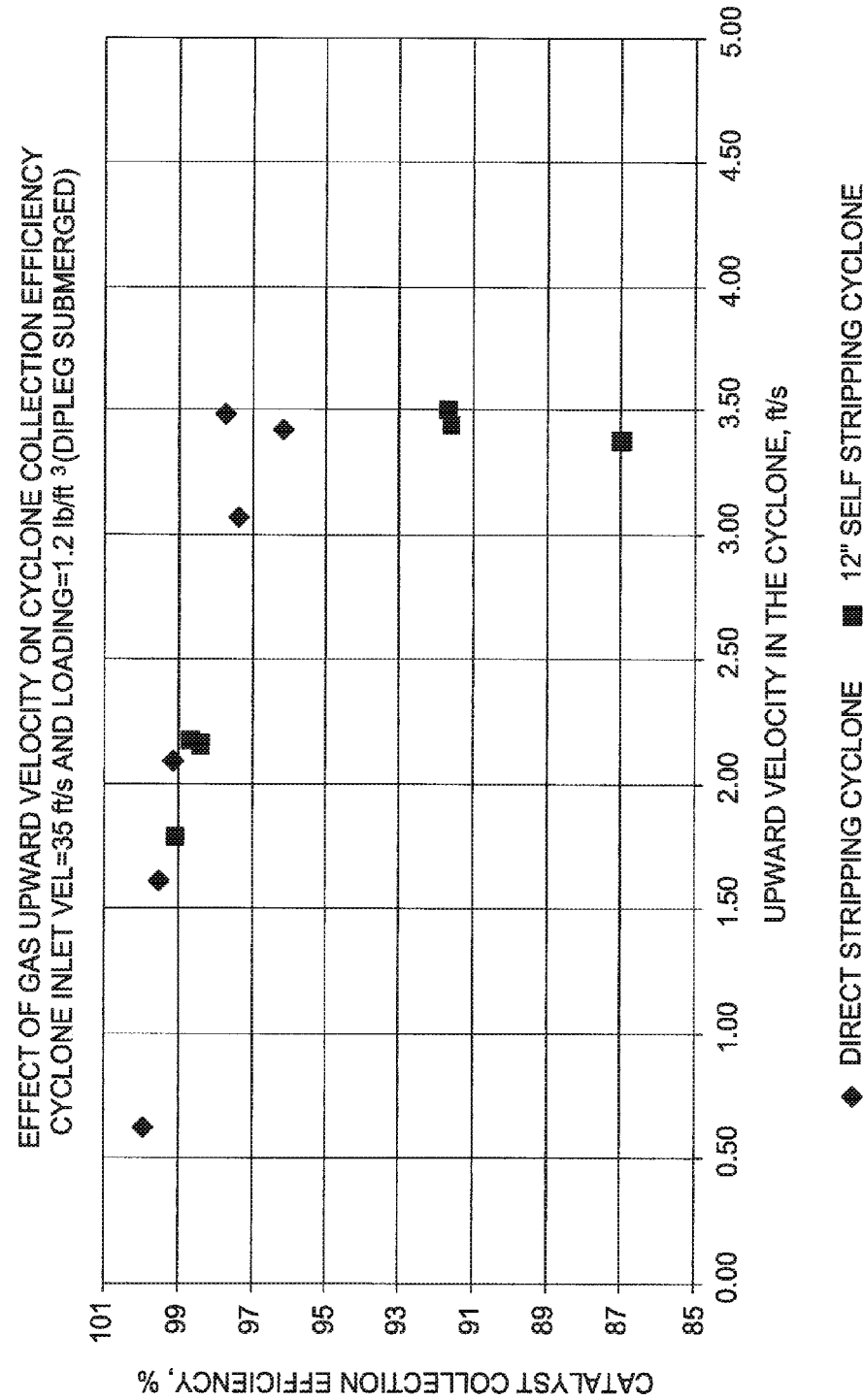
FIG. 5 shows the effect of fluid upward velocity on cyclone collection efficiency, according to one or more embodiments described.

Example 1 illustrates the effect of stripping fluid upward velocity on catalyst collection efficiency (percentage of solids entering the separator 100 via inlet 160 and exiting via connection 150) using comparable direct stripping and self stripping separators. The feed velocity was maintained constant at 10.7 m/sec (35 ft/sec) and the feed particulate loading was maintained constant at about 16 kg/m$^3$ (1.2 lb/ft$^3$) for the duration of the test. In each case, the upward velocity of the stripping fluid was varied between 0.2 m/sec (0.5 ft/sec) and 1.1 m/sec (3.5 ft/sec) and the catalyst collection efficiency was measured. FIG. 5 shows the effect of the fluid upward velocity in relation to the cyclone collection efficiency.

As demonstrated by the data presented in FIG. 5, at relatively low upward velocities of from about 0.2 m/sec (0.5 ft/sec) to about 0.7 m/sec (2.2 ft/sec) the catalyst collection efficiency of the direct stripping and self-stripping separators was comparable. At greater upward velocities, i.e. about 0.9 m/sec (3.0 ft/sec) or more, the collection efficiency of the direct stripping cyclone 100 provided a significant (5% to 7%) performance improvement over a self-stripping cyclone operating with a comparable inlet velocity and solids loading.

Example 2 illustrates the effect of stripping fluid upward velocity on vapor containment efficiency (percentage of gas that enters the separator via inlet 160 and exits via line 155) of a direct-stripping cyclone 100. In the direct-stripping cyclone 100, the stripping fluid was introduced into the stripping section 130 via one or more nozzles 185.

Figure 6:
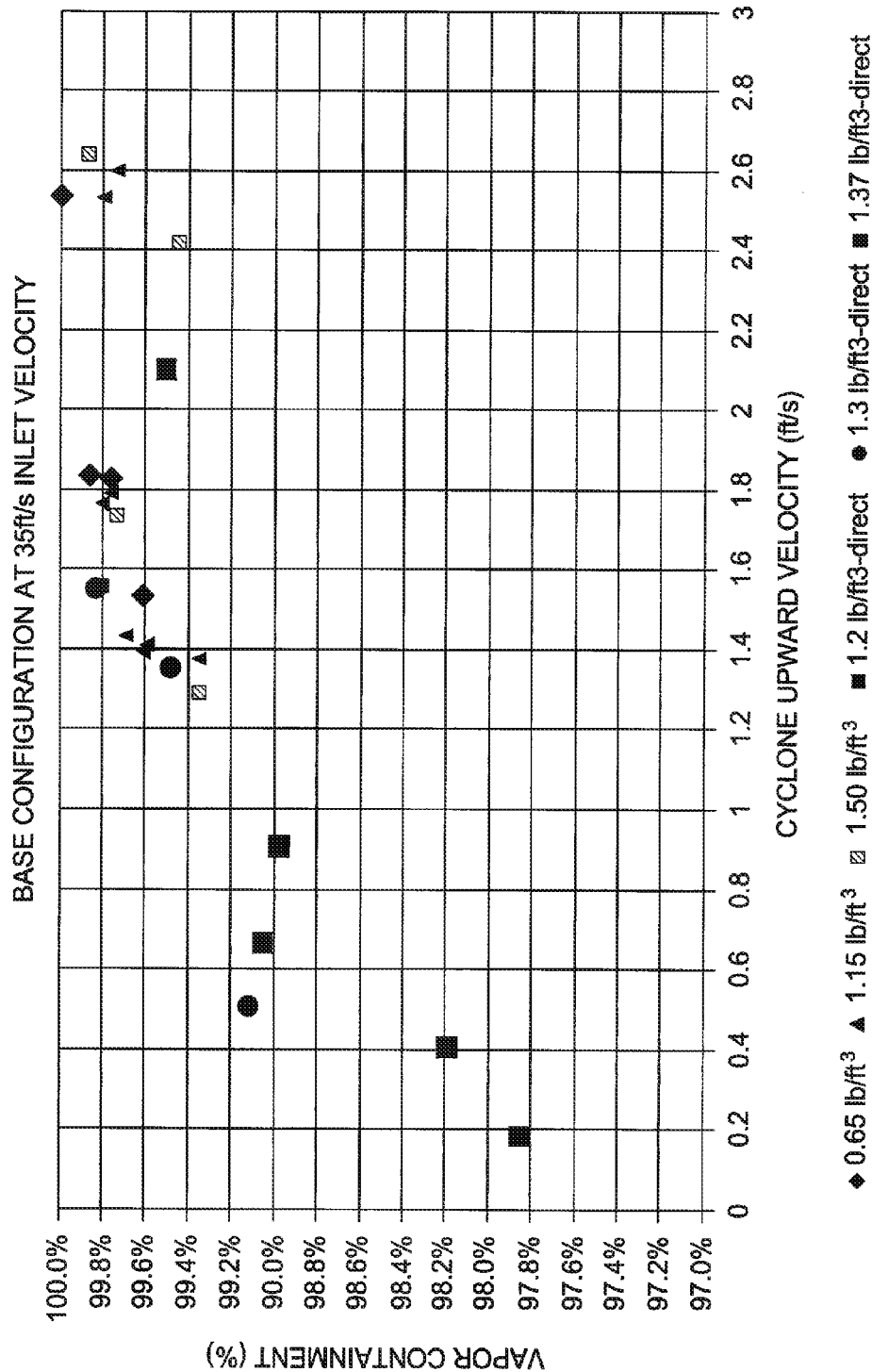
FIG. 6 shows the effect of stripping fluid upward velocity on vapor containment efficiency, according to one or more embodiments described.

The feed velocity to the direct-stripping cyclone was maintained at 10.7 m/sec (35 ft/sec) while the feed particulate loading was varied from about 10.4 kg/m$^3$ (0.65 lb/ft$^3$) to about 24.0 kg/m$^3$ (1.5 lb/ft$^3$). The upward velocity of the stripping fluid was varied from about 0.06 m/sec (0.2 ft/sec) to about 0.8 m/sec (2.7 ft/sec). FIG. 6 shows the effect of stripping fluid upward velocity in relation to vapor containment efficiency.

As shown in FIG. 6, the vapor collection efficiency was significantly improved, i.e. about 30%, by increasing the upward velocity of the stripping fluid within the direct-stripping cyclone 100, which separated a substantial portion of the gas from the feed. Also, the quantity of gas entrained in the settled solids collected in the stripping section 130 was surprisingly reduced by increasing the gas separation in the separation section 120 of the direct-stripping cyclone 100. Further, the increased upward velocity of the stripping fluid within the direct-stripping cyclone 100 did not substantially affect the solids collection efficiency of the direct-stripping cyclone 100.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A separator for separating particulate-fluid suspensions, comprising:
   a first section having a first inside diameter;
   a second section having a second inside diameter;
   a third section having a frustoconical inner surface, wherein a first end of the third section has an inside diameter equal to the second inside diameter and a second end of the third section has an inside diameter less than the second inside diameter, wherein the second section is disposed between the first section and the first end of the third section, and wherein the first, second, and third sections are disposed coaxially along a common longitudinal centerline;
   a conical stabilizer disposed coaxially along the common longitudinal centerline between the first and second sections, wherein an apex of the stabilizer is oriented toward the first section, and wherein a base of the stabilizer has a diameter less than the second inside diameter; and
   a plurality of apertures disposed about the third section, wherein the plurality of apertures are in fluid communication with a fluid distribution channel.

2. The separator of claim 1, wherein the fluid distribution channel is an annular conduit having a plurality of apertures defined in a wall thereof; and a plurality of fluid conduits, each fluid conduit connecting one or more apertures on the fluid distribution channel to one or more of the plurality of apertures disposed about the third section.

3. The separator of claim 1, wherein the first inside diameter is equal to the second inside diameter.

4. The separator of claim 1, wherein the first inside diameter is greater than the second inside diameter.

5. The separator of claim 4, further comprising a fourth section having a frustoconical inner surface, wherein a first end of the fourth section has an inside diameter equal to the first inside diameter and a second end of the fourth section has an inside diameter equal to the second inside diameter, wherein the fourth section is disposed between the first section and the second section, and wherein the fourth section is disposed coaxially along the common longitudinal centerline.

6. The separator of claim 5, wherein the conical stabilizer is disposed within the fourth section.

7. The separator of claim 1, wherein one or more fluid distribution nozzles are disposed in each of the plurality of apertures disposed about the third section.

8. The separator of claim 1, wherein the plurality of apertures are distributed symmetrically about the third section.

9. The separator of claim 1, wherein the second end of the third section defines a particulate discharge outlet, wherein the particulate discharge outlet is in fluid communication with a particulate discharge conduit.

10. The separator of claim 9, wherein the particulate discharge outlet has a diameter, and wherein the diameter of the particulate discharge outlet is from about 25% to about 50% of the first inside diameter.

11. The separator of claim 1, further comprising a particulate-fluid suspension inlet tangentially disposed on a sidewall of the first section; and a fluid outlet concentrically disposed through a first end of the first section, wherein the first end of the first section opposes a second end of the first section, wherein the second end of the first section is connected to the second section, and wherein the fluid outlet is disposed coaxially along the common longitudinal centerline.

12. An separator for separating particulate-fluid suspensions, comprising:
   a first section having a first inside diameter, a first end, and a second end;
   a particulate-fluid inlet tangentially disposed on a sidewall of the first section;
   a fluid outlet concentrically disposed through the first end of the first section;
   a second section having a second inside diameter, a first end, and a second end;
   a third section having a frustoconical inner surface, a first end, and a second end, wherein the first end of the third section has an inside diameter equal to the second inside diameter and the second end of the third section has an inside diameter less than the second inside diameter, wherein the second section is disposed between the second end of the first section and the first end of the third section, wherein the second end of the third section defines a particulate discharge outlet, and wherein the first, second, and third sections are disposed coaxially along a common longitudinal centerline;
   a particulate discharge conduit in fluid communication with the particulate discharge outlet;
   a conical stabilizer disposed coaxially along the common longitudinal centerline between the first and second sections, wherein an apex of the stabilizer is oriented toward the first section, and wherein a base of the stabilizer has a diameter less than the second inside diameter; and
   a plurality of apertures disposed about the third section, wherein the plurality of apertures are in fluid communication with a fluid distribution channel.

13. The separator of claim 12, wherein the second inside diameter is less than the first inside diameter, the apparatus further comprising a fourth section having a frustoconical inner surface, wherein a first end of the fourth section has an inside diameter equal to the first inside diameter and a second end of the fourth section has an inside diameter equal to the second inside diameter, wherein the first end of the fourth section is connected to the second end of the first section and the second end of the fourth section is connected to the first end of the second section, wherein the fourth section is disposed coaxially along the common longitudinal centerline, and wherein the conical stabilizer is disposed within the fourth section.

14. The separator of claim 12, wherein the fluid distribution channel is an annular conduit having a plurality of apertures defined by a wall thereof; and
   a plurality of fluid conduits, each fluid conduit connecting one or more apertures on the fluid distribution channel to one or more of the plurality of apertures disposed about the third section.

15. The separator of claim 12, wherein the first inside diameter is equal to the second inside diameter.

16. The separator of claim 12, wherein one or more fluid distribution nozzles are disposed in each of the plurality of apertures disposed about the third section.

17. The separator of claim 1, wherein the plurality of apertures are distributed symmetrically about the third section, wherein the particulate discharge outlet has a diameter, and wherein the diameter of the particulate discharge outlet is from about 25% to about 50% of the first inside diameter.

18. A fluid catalytic cracking system, comprising:
   a fluidized catalytic cracking riser having a product outlet in fluid communication with a particulate-fluid inlet in fluid communication with a separator, wherein the separator comprises:
      a first section having a first inside diameter, a first end, and a second end, wherein the particulate-fluid inlet is tangentially disposed on a sidewall of the first section;
      a fluid outlet concentrically disposed through the first end of the first section;
      a second section having a second inside diameter, a first end, and a second end;
      a third section having a frustoconical inner surface, a first end, and a second end, wherein the first end of the third section has an inside diameter equal to the second inside diameter and the second end of the third section has an inside diameter less than the second inside diameter, wherein the second section is disposed between the second end of the first section and the first end of the third section, wherein the second end of the third section defines a particulate discharge outlet, and wherein the first, second, and third sections are disposed coaxially along a common longitudinal centerline;
      a particulate discharge conduit in fluid communication with the particulate discharge outlet;
      a conical stabilizer disposed coaxially along the common longitudinal centerline between the first and second sections, wherein an apex of the stabilizer is oriented toward the first section, and wherein a base of the stabilizer has a diameter less than the second inside diameter; and a plurality of apertures disposed about the third section, wherein the plurality of apertures are in fluid communication with a fluid distribution channel; and a regenerator in fluid communication with the particulate discharge conduit.

19. The system of claim 18, wherein the fluid outlet is in fluid communication with a discharge duct via a slip-fit connection.

20. The system of claim 18, wherein the separator is disposed within a vessel, and wherein during operation of the fluidized catalyst system a pressure within the separator is greater than a pressure within the vessel.

* * * * *